US012597256B2

(12) United States Patent
Moran et al.

(10) Patent No.: US 12,597,256 B2
(45) Date of Patent: Apr. 7, 2026

(54) PARKING LOT MONITORING AND PERMITTING SYSTEM

(71) Applicant: Municipal Parking Services, Inc., Minnetonka, MN (US)

(72) Inventors: Mark J. Moran, Austin, TX (US); James Martin, Minneapolis, MN (US); Todd Finke, Big Lake, MN (US); Alexander J. Palumbo, St. Paul, MN (US)

(73) Assignee: Municipal Parking Services, Inc., Golden Valley, MN (US)

( * ) Notice: Subject to any disclaimer, the term of this patent is extended or adjusted under 35 U.S.C. 154(b) by 26 days.

(21) Appl. No.: 18/424,424

(22) Filed: Jan. 26, 2024

(65) Prior Publication Data

US 2024/0257523 A1 Aug. 1, 2024

Related U.S. Application Data

(60) Provisional application No. 63/441,437, filed on Jan. 26, 2023.

(51) Int. Cl.
*G06V 20/62* (2022.01)
*G06Q 30/0283* (2023.01)
(Continued)

(52) U.S. Cl.
CPC ......... *G06V 20/52* (2022.01); *G06Q 30/0283* (2013.01); *G06V 10/75* (2022.01);
(Continued)

(58) Field of Classification Search
CPC ...... G06V 20/52; G06V 10/75; G06V 20/625; G06V 2201/08; G06Q 30/0283; H04N 7/181
(Continued)

(56) References Cited

U.S. PATENT DOCUMENTS 9,870,648 B2 * 1/2018 Moran .................... G06V 20/52
10,121,172 B2 * 11/2018 Hudson .............. G06Q 30/0284
(Continued)

FOREIGN PATENT DOCUMENTS

CN 114934467 A * 8/2022 .............. E01F 13/04
WO WO-2020211691 A1 * 10/2020

OTHER PUBLICATIONS

The International Search Report and Written Opinion rendered by the International Searching Authority for PCT/US24/13207, dated May 1, 2024, 10 pages.

*Primary Examiner* — Thai Q Tran
*Assistant Examiner* — Stephen R Smith
(74) *Attorney, Agent, or Firm* — Skaar Ulbrich Macari, P.A.

(57) ABSTRACT

A parking facility employs an entrance camera and an exit camera to identify vehicles entering and exiting the parking facility in order to manage parking events. A secondary camera is located remote from the parking facility and nearby a hotel, restaurant or other venue where there exists a valet or check-in area. Each of the entrance, exit and secondary cameras are networked with a central computing system. Vehicles passing by the secondary camera are identified and a temporary parking permit for the parking facility can be quickly established based upon the data collected by the secondary camera so that hourly charges are not incurred when the vehicle parks in the parking facility.

18 Claims, 8 Drawing Sheets

(51) Int. Cl.
  *G06V 10/75* (2022.01)
  *G06V 20/52* (2022.01)
  *H04N 7/18* (2006.01)
(52) U.S. Cl.
  CPC ........... *G06V 20/625* (2022.01); *H04N 7/181* (2013.01); *G06V 2201/08* (2022.01)
(58) Field of Classification Search
  USPC ............... 348/148, 118; 340/988; 455/456.1; 701/33.4, 1; 705/5
  See application file for complete search history.

(56) References Cited

U.S. PATENT DOCUMENTS

| | | | | |
|---|---|---|---|---|
| 2001/0018660 | A1* | 8/2001 | Sehr | G07F 7/02 |
| | | | | 705/41 |
| 2005/0267657 | A1* | 12/2005 | Devdhar | G06V 20/647 |
| | | | | 701/1 |
| 2007/0069921 | A1* | 3/2007 | Sefton | G08G 1/207 |
| | | | | 340/932.2 |
| 2007/0126603 | A1* | 6/2007 | Driscoll | G08G 1/14 |
| | | | | 340/988 |
| 2011/0018991 | A1* | 1/2011 | Watanabe | B60R 1/28 |
| | | | | 348/118 |
| 2015/0172056 | A1* | 6/2015 | Meunier | G08G 1/04 |
| | | | | 380/28 |
| 2017/0309061 | A1 | 10/2017 | Wang et al. | |
| 2019/0130203 | A1* | 5/2019 | Hudson | G06T 7/13 |
| 2020/0207334 | A1* | 7/2020 | Cho | G08G 1/168 |
| 2020/0312044 | A1* | 10/2020 | Hudson | G07B 15/02 |
| 2020/0365027 | A1* | 11/2020 | Noguchi | G08G 1/149 |
| 2021/0312724 | A1* | 10/2021 | Petri | H04W 4/40 |
| 2021/0316718 | A1* | 10/2021 | Sugano | G06Q 10/20 |
| 2023/0391216 | A1* | 12/2023 | Salter | G08G 1/149 |
| 2024/0046689 | A1* | 2/2024 | Ali | G06F 11/2094 |

* cited by examiner

PARKING LOT MONITORING AND PERMITTING SYSTEM

PRIORITY

This application claims priority to and the benefit of U.S. Provisional Patent Application No. 63/441,437, filed Jan. 26, 2023, which is incorporated fully herein by reference.

FIELD

The present invention relates to devices, methods and systems for monitoring parking in a parking facility, and more particularly, to devices, methods and systems for conveniently creating temporary permits for parking in parking facilities.

BACKGROUND

Automated parking management systems for parking lots and ramps are disclosed, for example, in U.S. Pat. No. 10,121,172 B2 (which is incorporated herein by reference in its entirety and appended hereto as part of this application). Such systems utilize license plate recognition (LPR) cameras to read a license plate of each vehicle entering and exiting the parking facility.

In order to establish a "parking session" the vehicle's plate is "read" by a camera utilizing LPR upon the vehicle's entrance to the parking facility. This allows the parking management system to add to the occupancy tally of vehicles in the facility and to time the vehicle's occupancy in the facility for accurate charging of parking time.

The parking session ends when the vehicle's plate is again read by a camera at the exit of the facility using LPR. This allows the parking management system to subtract the vehicle from the occupancy tally of vehicles in the facility and to calculate the charging for parking time spent in the parking facility.

Hotels, casinos, restaurants, and other venues often offer valet parking for customers, patrons and VIPs. Often the valets must park the vehicles in a parking facility that is shared with non-valet parkers. When the parking facility is automated as described above this presents an administrative burden because the parking monitoring system either must be updated for each valet parking event or each vehicle parked by the valet must be paid for to avoid a parking citation. Valets are usually under time pressure to quickly park and retrieve vehicles. Thus, the additional administrative time it takes to update the parking monitoring system is undesirable. Therefore, there is a need for improved parking facility management systems, devices and methods that address some or all of the drawbacks of conventional parking facility management systems.

SUMMARY

This invention is directed to parking facilities, such as lots, ramps, garages and streets where vehicles entering and exiting a monitored area are conveniently added as permitted parking via an automated process. In one example, a parking facility employs an entrance camera and an exit camera to identify vehicles entering and exiting the parking facility in order to manage parking events. A secondary camera is located remote from the parking facility and nearby a hotel, restaurant or other venue where there exists a valet or check-in area. The check-in area can also apply to a separate entrance to the parking facility for very important persons (VIPs). Each of the entrance, exit and secondary cameras are networked with a central computing system. Vehicles passing by the secondary camera are identified and a temporary parking permit for the parking facility can be quickly established based upon the data collected by the secondary camera so that hourly charges are not incurred when the vehicle parks in the parking facility.

In another example, provided is an automated parking system for a parking facility and a valet/check-in area located remote from the parking facility. The parking facility comprises an entrance and an exit. The automated parking system comprises a first camera disposed adjacent to the entrance of the parking facility, a second camera disposed adjacent to the exit of the parking facility, a third camera disposed in or adjacent to the valet/check-in area, and a central computer located remote from the parking facility and the valet/check-in area. The central computer is networked with the first camera, the second camera and the third camera. The first camera is configured to read a vehicle identification of a vehicle entering the parking facility and transmit the vehicle identification of the vehicle entering the parking facility to the central computer. The second camera is configured to read a vehicle identification of a vehicle exiting the parking facility and transmit the vehicle identification of the vehicle exiting the parking facility to the central computer. The third camera is configured to read a vehicle identification of a vehicle passing through the valet/check-in area and transmit the vehicle identification of the vehicle passing through the valet/check-in area to the central computer.

The central computer can comprise a parking permit database to store vehicle identifications for vehicles with permits for parking in the parking facility. The central computer can be configured to add the vehicle identification of the vehicle passing through the valet/check-in area to the parking permit database. The central computer can be configured to compare the vehicle identification of the vehicle entering the parking facility to the stored vehicle identifications in the parking permit database to determine whether there is a match.

When the central computer determines that there is no match of the vehicle identification of the vehicle entering the parking facility to the stored vehicle identifications in the parking permit database, the central computer can be further configured to calculate a parking fee for a parking duration from a time that the vehicle entered the parking facility to a time that the vehicle exited the parking facility. When the central computer determines that there is a match of the vehicle identification of the vehicle entering the parking facility to the stored vehicle identifications in the parking permit database, the central computer does not calculate an hourly charge for parking by the vehicle.

The central computer can prompt an authorized person to manually verify whether to add the vehicle identification of the vehicle passing through the valet/check-in area to the parking permit database before the central computer adds the vehicle passing through the valet/check-in area to the parking permit database.

The vehicle identification of the vehicle entering the parking facility and the vehicle identification of the vehicle passing through the valet/check-in area each can include characters appearing on a license plate. The vehicle identification of the vehicle entering the parking facility and the vehicle identification of the vehicle passing through the valet/check-in area each can include an image of the vehicle.

Each of the first camera, second camera and third camera can be license plate reading (LPR) cameras. The third camera can be enclosed within a bollard or within a kiosk.

Further provided is a method of automatically monitoring of vehicles entering and exiting the parking facility. In one example, the method comprises capturing a vehicle identification with a first camera as the vehicle passes through a valet/check-in area that is located remote from the parking facility, storing the vehicle identification captured by the first camera in a parking permit database of a central computer system that is located remote from the parking facility and the valet/check-in area, capturing a vehicle identification with a second camera as the vehicle passes through an entrance to the parking facility, and comparing by the central computer system the vehicle identification captured with the second camera to the parking permit database to determine whether there is a match of vehicle identifications maintained in the parking permit database.

When the central computer determines that there is no match of the vehicle identification captured with the second camera to the parking permit database, the central computer can calculate a parking fee for a parking duration from a time that the vehicle entered the parking facility to a time that the vehicle exited the parking facility. When the central computer determines that there is a match of the vehicle identification captured with the second camera to the parking permit database, the central computer does not calculate an hourly charge for parking by the vehicle.

An authorized person can be prompted to manually verify whether to add the vehicle identification of the vehicle passing through the valet/check-in area to the parking permit database prior to storing the vehicle identification captured by the first camera in the valet/check-in area.

Capturing the vehicle identification can include performing a license plate reading of a license plate of the vehicle. Capturing the vehicle identification can further include transmitting an image of the vehicle to the central computer. The central computer can determine from the transmitted image at least one of a vehicle type, make, model, year and color, and storing a result of such determination in the parking permit database.

The stored vehicle identification captured by the first camera can be purged from the parking permit database after a predetermined period of time.

A vehicle sensor coupled to the first camera (valet/check-in camera) can be provided to detect the approach of the vehicle to the camera prior to capturing the vehicle identification with the camera.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
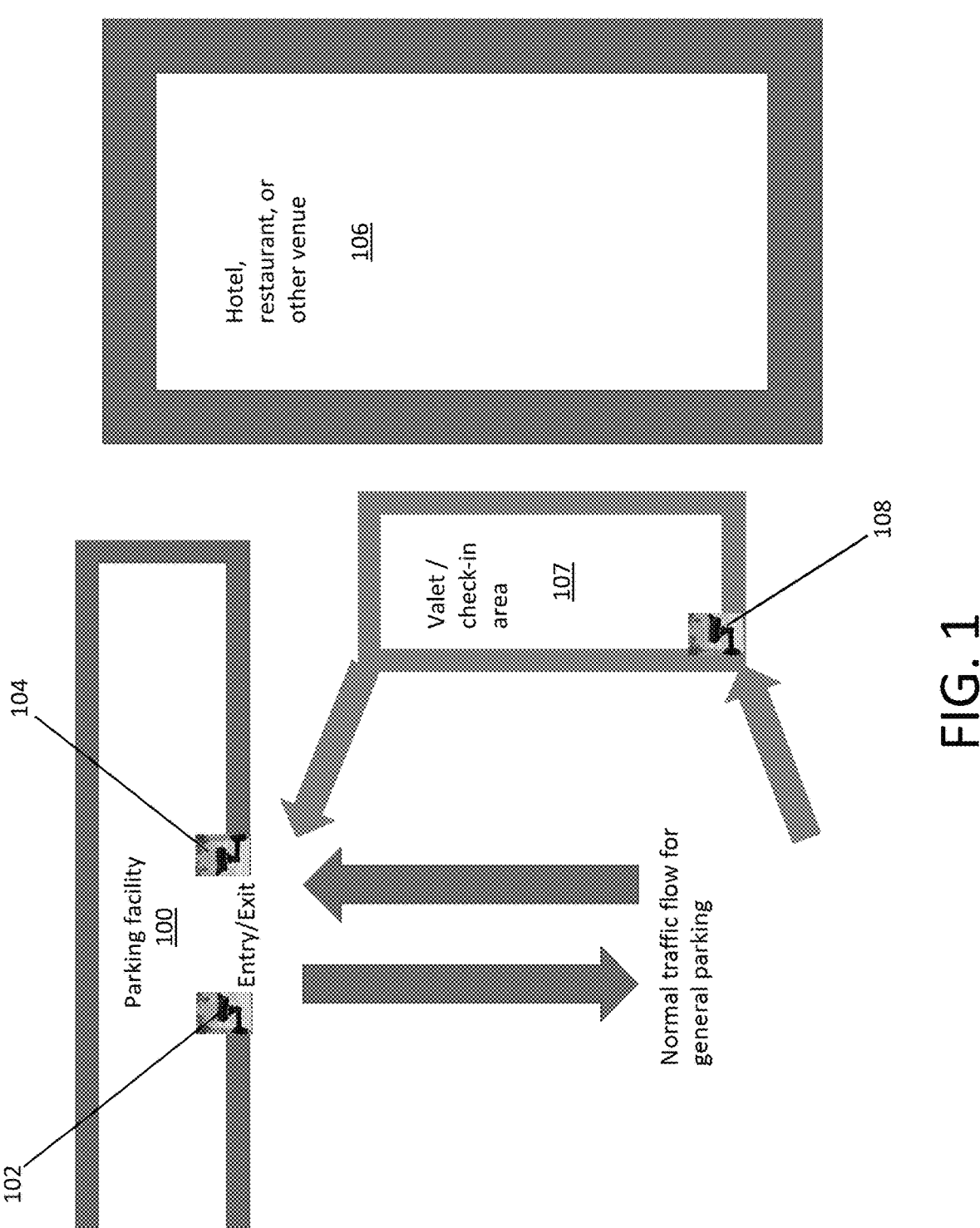
FIG. 1 is a perspective view of a parking facility according to certain embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. The various features or aspects discussed herein can also be combined in additional combinations and embodiments, whether or not explicitly discussed herein, without departing from the scope of the invention, Referring to FIG. 1, a parking facility 100 employs an entrance camera 102 and an exit camera 104 to monitor vehicles entering and exiting the parking facility 100. Each camera 102, 104 is configured to read the license plate data (license plate reading or LPR) of each vehicle as it passes by the camera. The cameras 102, 104 each capture video and/or images of each vehicle as well and pass the collected data to a central control computer 110 (discussed in more detail below) that is networked with each camera 102, 104.

The parking facility 100 is a parking ramp, parking garage, open parking lot or other defined area where all vehicle traffic entering and leaving the facility can be monitored. There may be more than one entrance/exit, and entrance/exit cameras are located at each such entrance and exit location. However, for sake of simplicity, the parking facility in FIG. 1 only depicts a single point of entrance and exit.

A hotel, restaurant, event center, or other venue 106 is nearby the parking facility 100 so that patrons of the venue 106 and valets can park vehicles belonging to the patrons of the venue 106. The parking facility 100 may be shared with others that are not patrons of the venue 106 that may wish to park in the facility 100. Alternatively, the parking facility 100 can be exclusively reserved for parking by patrons and valets of the venue 106.

A secondary camera 108 is located remote from the parking facility in a valet or check-in area 107 (hereinafter simply referred to as the valet area for convenience). The secondary camera 108 is also an LPR capable camera and is networked with the central control computer 110. Preferably, the secondary camera 108 is located adjacent to the valet area 107 where patrons of the venue 106 pass by in their vehicles to hand off the vehicle to the valets or to check-in at the venue and then self-park in the facility 100. Such location ensures that the secondary camera 108 can read the license plates of vehicles as they pass by.

It should be noted that alternative vehicle identifications, such as descriptive credentialing, can be provided as an alternative to reading license plates (or in addition to reading license plates) without departing from the scope of the invention. For example, a vehicle shape and/or color can be recognized by the system. Near-field communication devices can also be read in further embodiments. Radio frequency identification (RFID) tags on vehicles can also be read by the secondary camera 108.

Figure 2:
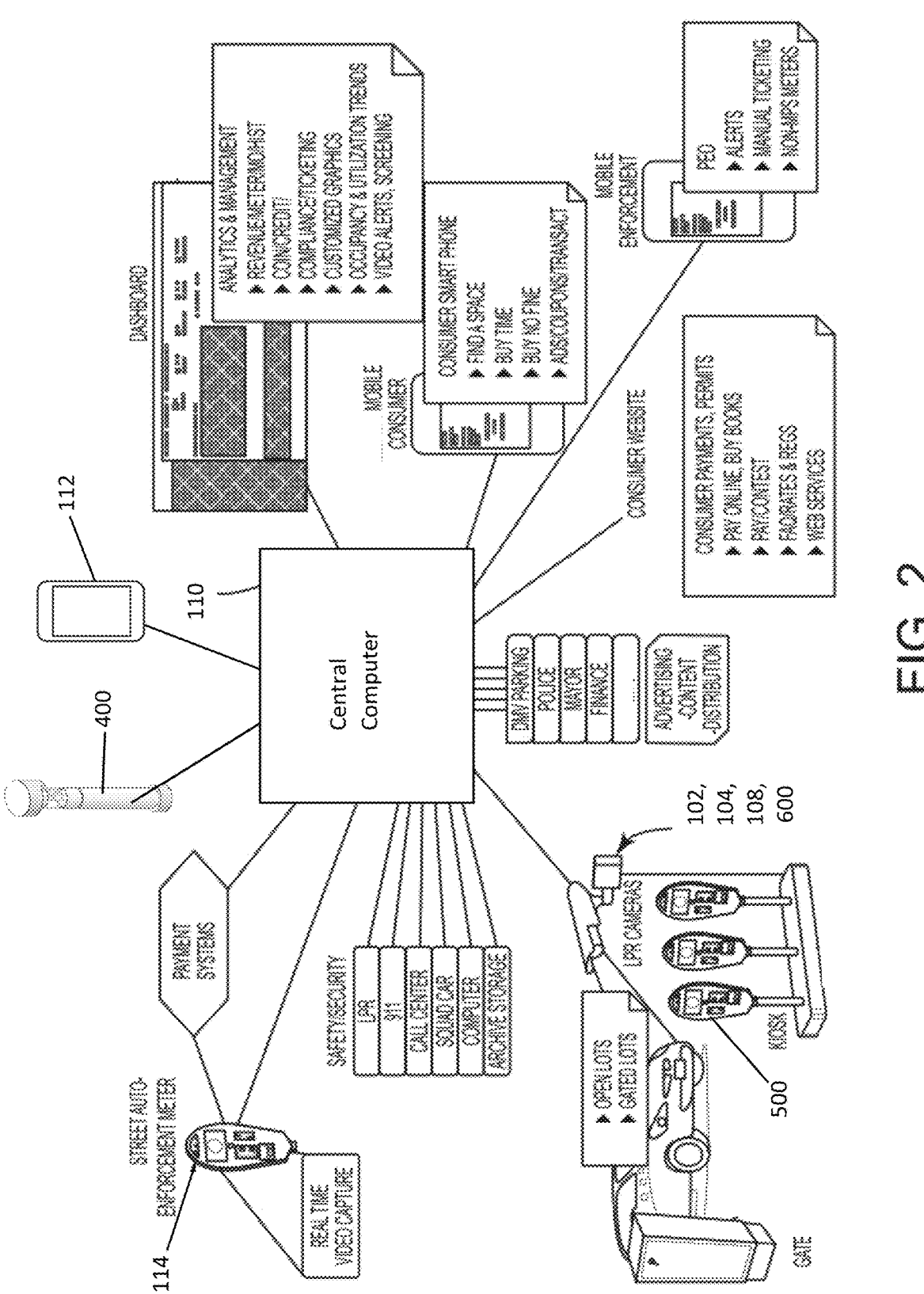
FIG. 2 is a diagram of parking system components according to certain embodiments.

Referring now to FIG. 2, a component diagram of an integrated parking system is shown. A variety of devices are networked with the central computer 110, including the entrance camera 102, exit camera 104 and the secondary camera 108. The central control computer 110 can be one or more remotely-located servers that are part of a "cloud" system. The central control computer 110 manages each parking session occurring in the parking facility 100. Additional details of parking session monitoring and management are disclosed in published U.S. Patent Publication No. US 2023/0082134 A1, which is hereby incorporated herein by reference in its entirety.

Figure 3:
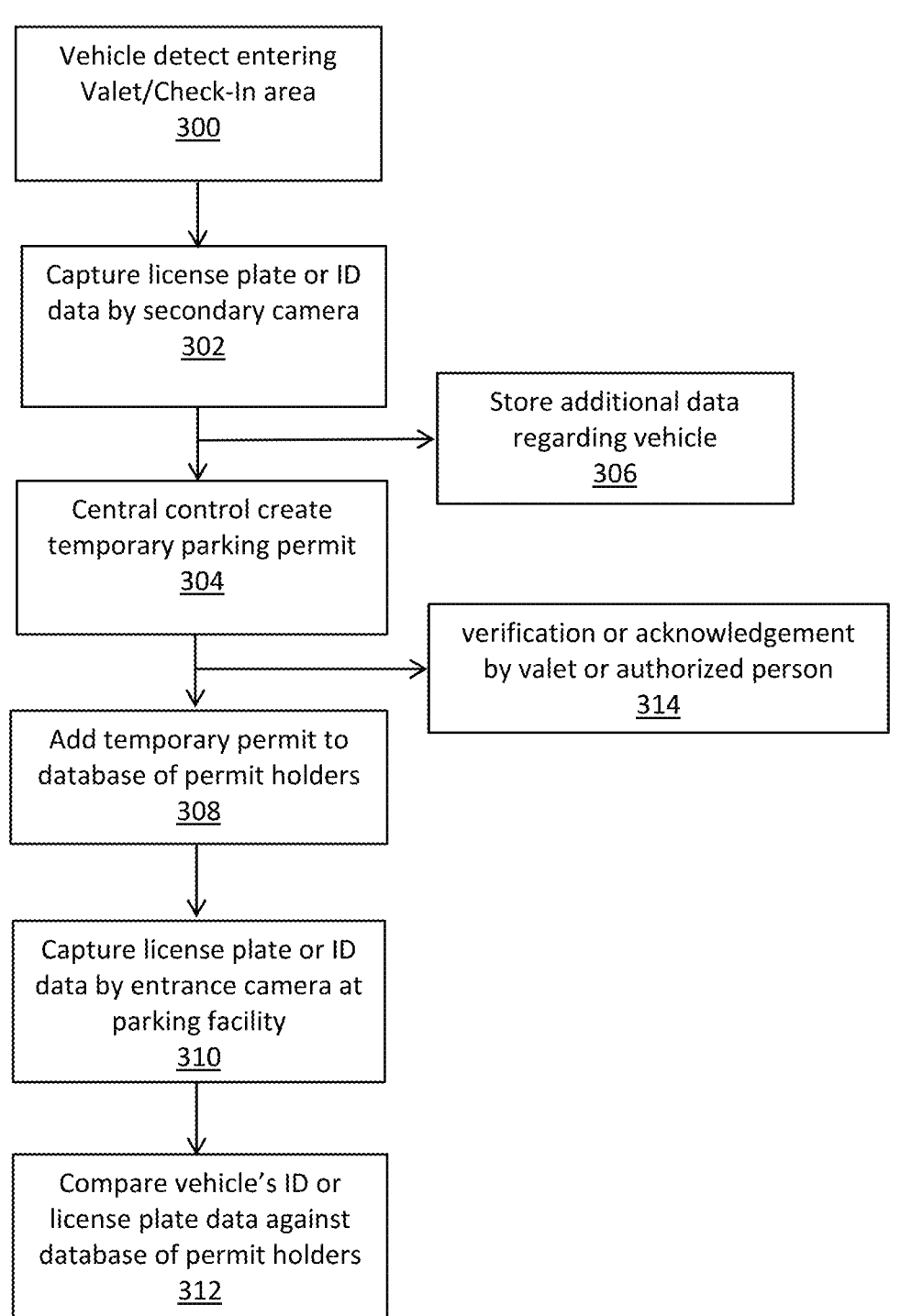
FIG. 3 is a flowchart of parking process steps or functions according to certain example embodiments.

Referring additionally to FIG. 3, in the present parking system and method, the secondary camera 108 is used to create a temporary parking permit for the patron's vehicle for parking in the parking facility 100. When a patron's vehicle enters the "Valet/Check-In" area 107 such as shown in FIG. 1, the presence of the vehicle is detected 300 and then secondary camera 108 captures the license plate data 302 as part of a parking event. The central control computer 110 creates a special or temporary parking permit 304 for the patron's vehicle which is associated with the patron's vehicle license plate (or other vehicle ID). Additional data can be stored at the time of creating this permit as well 306, including duration of the permit, date, time of day, vehicle image, license plate image, vehicle type, vehicle color, make of vehicle, model, year, etc. The patron's vehicle is now established in the database of permit holders 308 for a limited duration (e.g., length of an event or a fixed time period as the case may be).

Then, after leaving the valet/check-in area 107, the vehicle proceeds to the parking facility 100. When the patron's vehicle enters the parking facility 100 it passes by the entrance camera 102 and the license plate is read again 310. The vehicle's identification information (license plate LPR data) is compared against the database of permit holders 312. If noted as a permit holder, the vehicle is allowed to park without additional payment for as long as the temporary permit is in effect 314. If not noted as a permit holder, the vehicle still may be allowed to park in the facility 100 but will be processed and billed according to general parking rules.

Once a permit duration expires, it is deleted by the central computer from the database of permit holders 312. If the temporary permit expires and the patron's vehicle attempts to regain entry to the parking facility 100 after said expiration, then the patron's vehicle is treated as a general parker.

In order to reduce the potential for misuse, the automatic generation of a temporary permit can be subject to an acknowledgement by a valet or other authorized individual 314. For example, the valet can be provided with a mobile computing device (e.g., a smartphone or tablet computer) 112 that is networked with the central computer 110 similar to the mobile consumer and mobile enforcement devices noted in FIG. 2. The valet can be provided with an authorization prompt when a vehicle passes the secondary cameras 108 and a new temporary permit is waiting for approval. The valet provides the authorization via the mobile computing device and the vehicle is now in the parking database as a temporary permit holder as explained above.

Similarly, the patron might be a guest at a hotel that wishes to self-park. The hotel employee at the check-in desk or kiosk can be provided with a prompt to authorize the temporary permit status for the hotel guest's vehicle 314.

A similar temporary permit and approval arrangement can be provided in other circumstances as well. For example, at truck stops, each parking space (or a multi-space area such as a parking lot) can be monitored with cameras 102, 104 for occupancy and subject to a parking charge. The truck driver can pass by the secondary camera 108 and then check-in with an employee to obtain authorization to park in a parking space. In another example, camping spaces at an RV park, state park, federal park, etc. can be monitored for occupancy via cameras 102, 104. As the guest drives by the secondary camera 108 an employee can provide authorization to park in a given space.

In a further example, the present system can be used by a business to allow parking at a metered parking space. If the parking space is monitored with a smart parking meter 114 such as disclosed in U.S. Pat. No. 9,773,351, for example, which is networked with the central computer 110, then the secondary camera 108 can be used by an authorized person 314 to provide a temporary parking pass to a patron to park at a specific parking meter 114 or at one of a plurality of parking meters 114. For example, a store owner may provide a secondary camera 108 in a location adjacent to their store, such as where customers are dropped off (and where valets may receive cars). The secondary camera 108 can be used in this situation to generate a temporary parking "validation" pass. U.S. Pat. No. 9,773,351 is hereby incorporated herein by reference in its entirety.

The secondary camera 108 can be in the form of a camera in a camera housing, or as a bollard, such as in U.S. Pat. No. 10,885,367 or as a kiosk, such as disclosed in U.S. Pat. No. 9,970,648. U.S. Pat. No. 10,885,367 is hereby incorporated herein by reference in its entirety.

Figure 4:
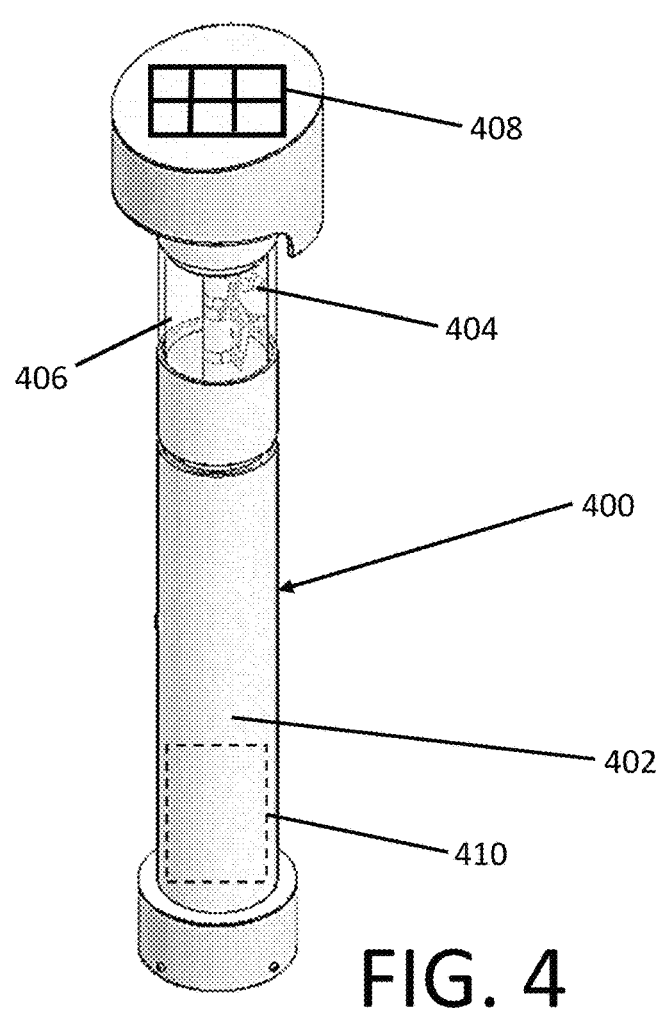
FIG. 4 is a perspective view of a camera bollard for a parking lot monitoring system according to certain example embodiments.

Referring to FIG. 4, the camera can be housed inside of a bollard 400. The bollard 40 can be mounted or secured adjacent to a location that the vehicles will pass so that the camera will have an unobstructed view of the vehicle license plates. In one example, the bollard 400 comprises an outer enclosure 402 with one or more cameras 404 and other electrical components, such as the microprocessor and memory disposed inside of the enclosure 402. A portion of the enclosure 402 can be transparent (or semi-transparent) which defines a window 406 so that the camera(s) 404 can see the license plates of vehicles passing by the bollard 400.

One or more vehicle sensors can also be located inside of, or on the exterior of, the enclosure 402. A solar panel 408 can be provided atop the enclosure 402 to generate some or all of the power necessary to operate the camera(s) 404 and other components of the bollard 400. A battery 410 can also be disposed inside of the enclosure 402 to store energy generated by the solar panel 408 and to power the camera(s) 404 and other components of the bollard 400. In some embodiments the bollard 400 does not need to be connected to the power grid because the solar panel 408 and onboard battery 410 are sufficient to supply all power needs.

Figure 5:
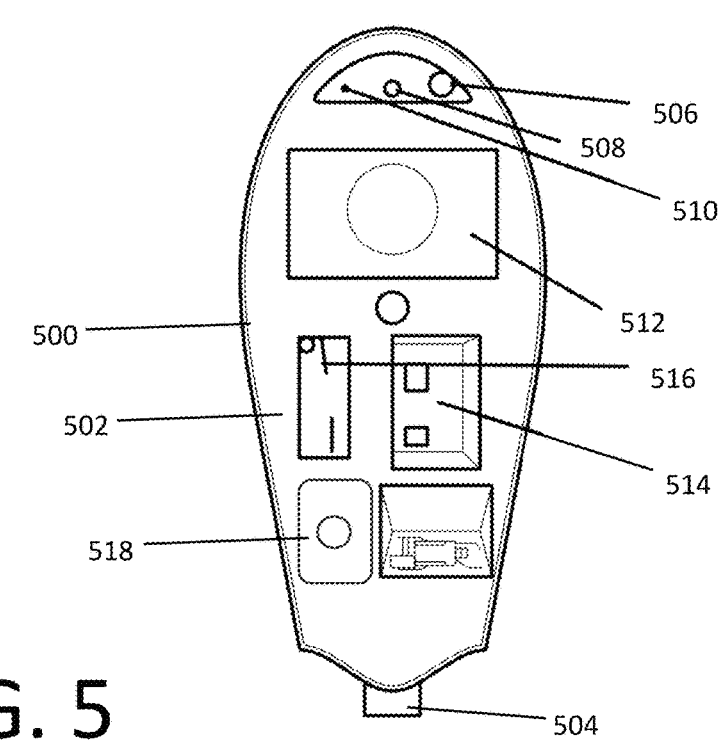
FIG. 5 is a front view of a kiosk for a parking lot monitoring system according to certain example embodiments.

Referring to FIG. 5, an example kiosk 500 is shown. The kiosk 500 comprises an enclosure or housing 502 mounted atop a pole 504. The housing 502 includes the electronics for controlling operation of the kiosk and for networking the kiosk 500 with a central control computer system 110, including a microprocessor and memory. The housing 502 includes a speaker 506, a user-facing camera 508 and microphone 510 disposed adjacent to the graphical user interface (e.g., touch screen) 512. A payment acceptance means 514 and coin slot 516 are also provided. The payment acceptance means 514 can be a contactless or conventional card reader, or other known means for accepting payment. One or more cameras 518 are disposed inside of the housing 502 such that they can see the license plates of vehicles passing by the kiosk 500. A vehicle sensor can also be provided to the kiosk 500.

Figure 6:
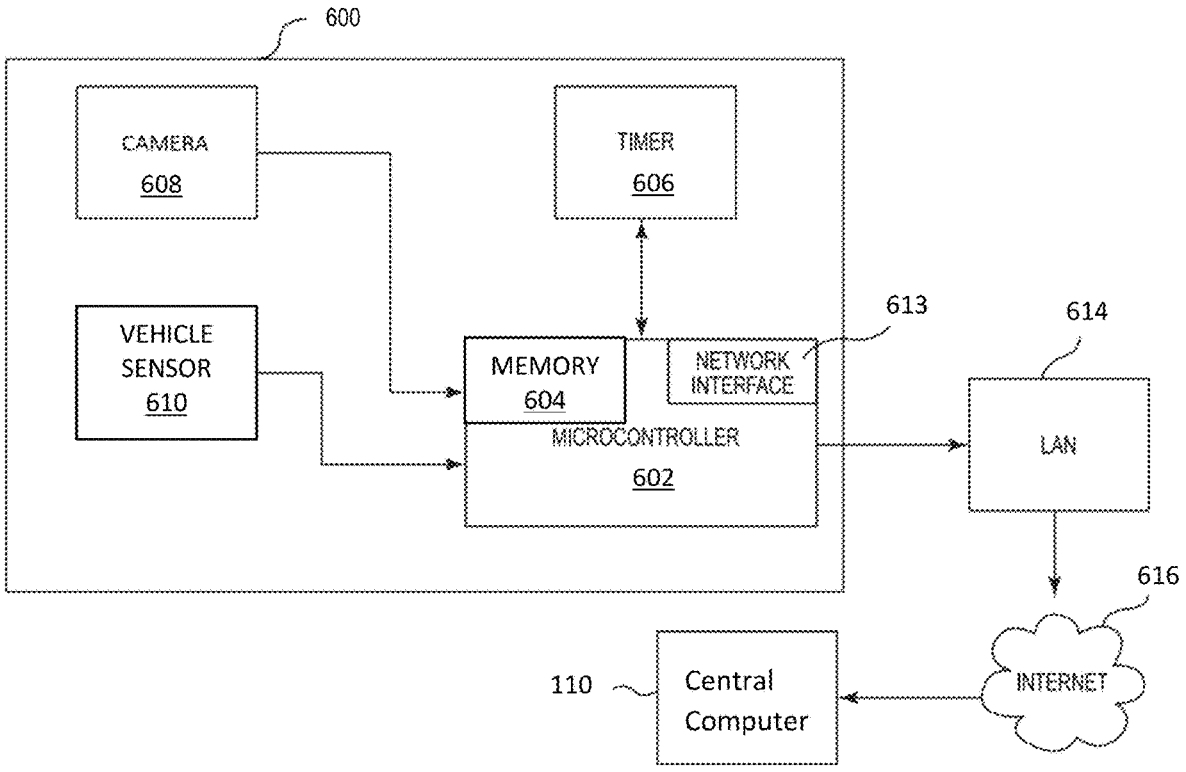
FIG. 6 is a block diagram of certain components of a parking lot monitoring system according to certain example embodiments.

Referring to FIG. 6, a block diagram for certain embodiments of the present parking system is provided. The camera device 600 refers hereinafter to any of the entrance/exit cameras 102, 104 and/or the secondary camera(s) 108. Camera 600 includes a microcontroller 602, or microprocessor, with associated physical memory 604. The software code controlling the operation and function of the camera device 600 is stored in the memory 604 and executed by the microcontroller 602. The memory 604 may include one or more non-volatile storage devices and/or one or more volatile storage devices (e.g., random access memory (RAM)).

Computer readable program code is stored in the memory 604, such as, but not limited to magnetic media (e.g., a hard disk), optical media (e.g., an OVO), memory devices (e.g., random access memory, flash memory), etc. The computer readable program code is configured such that when executed by the microcontroller 602, the program code causes the camera device 600 to perform the functions described herein. In other embodiments, the camera device 600 is configured to perform steps described herein without the need for program code.

A timer 606 can be coupled with and controlled by the microcontroller 602. The microcontroller 602 can also count processor clock cycles as a form of timer. The camera 608 (or multiple cameras) is/are coupled with and in two-way communication with the microcontroller 608. If provided, the vehicle sensor 610 is also operatively connected to the microcontroller 602.

Each camera device 600 is networked with the central or control computer 110. The camera device 600 includes a network interface 613 either integrated into the microcontroller 602, or as a separate component to enable the networking. The network interface 613 is configured to enable communication with a communication network (e.g., a local area network (LAN 614), the Internet or World Wide Web), using a wired and/or wireless connection. Network communication means include, but are not limited to, Wi-Fi, Bluetooth, cellular (HSPA, LTE, GSM, CDMA), DSL, cable, etc. The LAN 614 may include other camera devices and any kiosk(s), all in communication with one another at a given parking facility. In LAN configuration, the LAN 614 can be connected to the Internet 616 as illustrated in FIG. 6, so that communications with the cloud-based or central control computer system 110 can be accomplished.

The cloud, central or central computer system 110 (hereinafter the central computer) governs the operation of and/or stores the data from a given number of networked camera devices 600 and kiosks. The central computer 110 may comprise one or more servers interfacing with networked storage in a data center. The central computer 110 is located remotely in a secure location for convenience and security purposes. The LAN 614, in turn, is connected to the World Wide Web (i.e. Internet) in order to be in communication with a variety of other computing systems, including law enforcement, operations companies, user mobile devices, user web interfaces and security services, etc. such as indicated in FIG. 2. This way, the data collected by the cameras 600 and inputted by users and others can be securely stored and reviewed by appropriate authorities and the operations of all camera devices 600 in a given parking system can be monitored and remotely controlled via the central computer 110.

The LPR function can be performed onboard the camera devices 600 by the microcontroller 602 using LPR software stored in the memory 604. The LPR function can also be performed by a remotely-located computer system, such as the control computer 618. In such embodiment, the control computer 618 performs the recognition on image data provided by the networked camera device 600.

A decoder can also be included in the camera device to decode an identification where the license plate (or other part of the vehicle) is equipped with a radiofrequency identification (RFID) tag. In addition, the camera device 600 can be programmed to decode machine-readable glyphs and visual encodings, such as barcodes and matrix barcodes (e.g., QR codes), in order to read such encoded items on the vehicle's plate or other portion of the vehicle. Multiple decoding/reading means can be included in a given camera device 600 (or multiple separate devices can be provided) to allow the parking system to adapt to a variety of identification methodologies.

Figure 7:
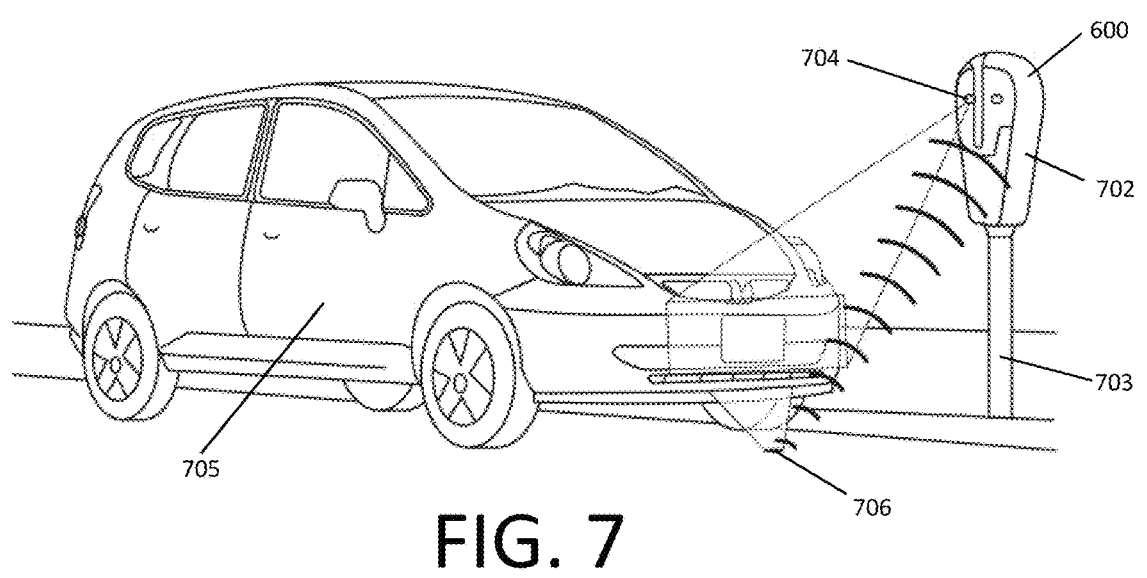
FIG. 7 is a diagram of a vehicle license plate being read by a camera as the vehicle passes by the camera device according to certain example embodiments.

Referring to FIG. 7, the camera device 600 is enclosed in a camera housing 702 that can be placed adjacent to the entrance or exit of the parking facility 100 or the valet/check-in area 107. The camera housing 702 can be disposed atop a pole 703 that is secured to the ground. The camera housing 702 can be configured as a bollard (e.g., FIG. 4) or other suitable configuration in other embodiments.

One or more individual cameras 704 can be disposed inside of the housing 702. The camera(s) 704 view outward through a window in the housing 702 or directly from the housing 702. The camera(s) 704 can also be mounted external to the housing 702. The camera(s) 704 can also be mounted on a pole separate from the housing 702 as a further alternative.

Also enclosed with the housing 702 are microprocessor(s), memory and computer code that enable the camera(s) 600 to read the license plates of vehicles 705 entering/exiting the parking facility 100 and/or passing through the valet/check-in area 107, as well as obtain still images and/or video of the vehicles 705.

In certain embodiments, a vehicle sensor 706 can be embedded in the ground below, on the pole 703, in the housing 702, or somewhere adjacent to, the vehicle 705. The vehicle sensor 706, such as a magnetic sensor, a radar sensor, sonic sensor or laser sensor, can be used to detect the presence of a vehicle to serve as a double-check on a vehicle detection function of the camera device 600, or it can serve as a low-power sensor to wake up the camera device 600 from a dormant or power-conserving state. The vehicle sensor 706 can also be a second camera.

The vehicle sensor 706 broadcasts a status message or output value to the nearby camera device 600 as shown in FIG. 7. The broadcast can be performed using low power Bluetooth or other short range wireless communications protocol. The broadcast frequency can be continuous or periodic. For example, the status of the vehicle sensor 706 can be broadcast once per second, ten times per second, etc.

In one preferred embodiment, the vehicle sensor 706 is powered by an internal lithium-based battery and a sensing/broadcast cycle is performed once per second in order to conserve battery life. A sensor life expectancy of several years can be achieved using such battery and operating method. In other embodiments, the sensor 706 can be hard-wired for power and/or broadcast.

In embodiments where the vehicle sensor 706 is integrated into, or located adjacent to, the camera device 600, the sensor 706 can be coupled to the camera 600 via internal wires (if internal) or via an electrical conduit (if external). The conduit can carry both power and data bi-directionally, or separate power and data conduits can be provided. More than one vehicle sensor 706 can also be employed.

The camera or cameras 604 disposed in the camera device 600 (or remotely from the housing 602 as discussed above) use image sensors (e.g., ccd or cmos) and can apply a background subtraction methodology to determine whether a vehicle 105 is passing into or out of the parking facility. Note that the background subtraction methodology can also be referred to as foreground subtraction and foreground detection. Edge detection, or other suitable optical sensing means, can be employed in other embodiments. A combination of detection methodologies can also be combined or used as a double-check on the other.

Figure 8:
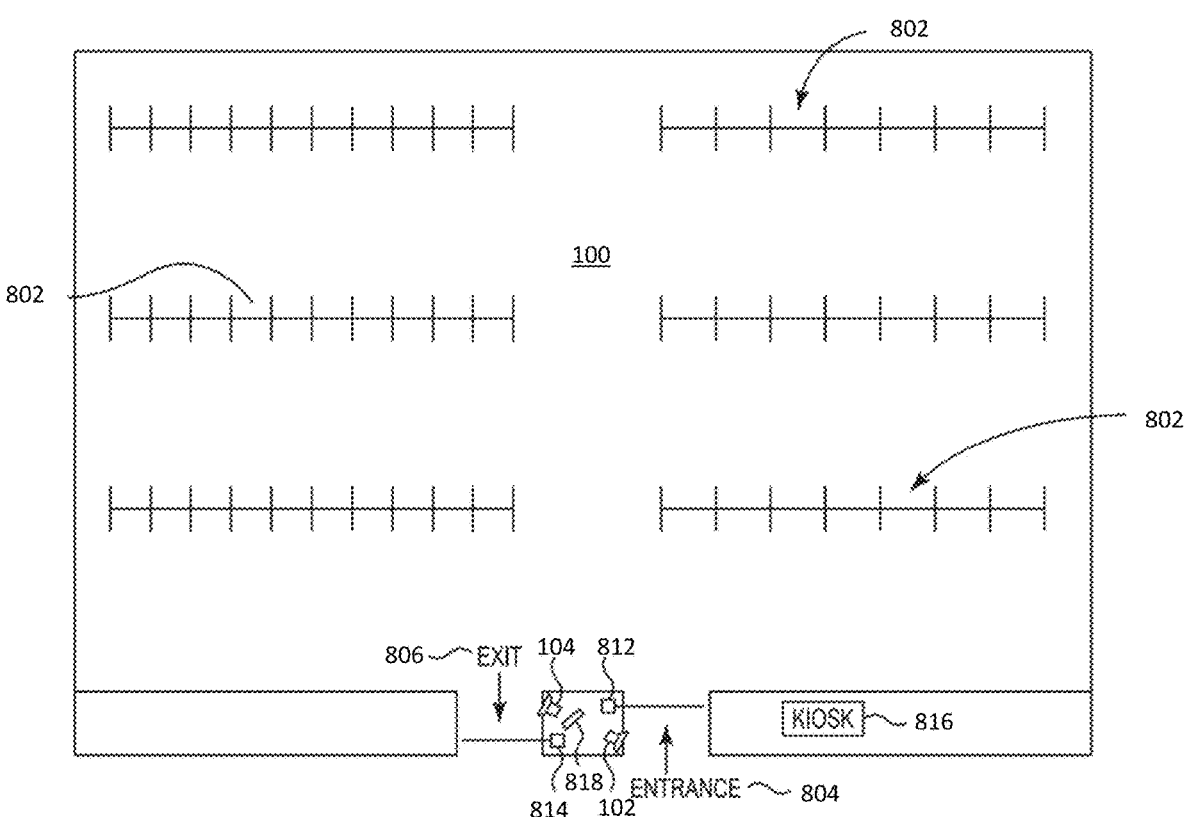
FIG. 8 is a diagram of a parking lot monitoring system according to certain example embodiments.

Referring now to FIG. 8, an example of an automated parking facility 100 such as a parking lot or parking ramp will be described. The description below uses the term "lot" but it should be understood that the present invention can be used for any form of parking facility.

The parking lot 100 comprises a plurality of parking spaces 802. The vehicle entrance 804 and exit 806 to the lot 100 are each monitored with a respective entrance/exit camera device 102, 104 located adjacent to the respective entrance 804 and exit 806. Of course, there can be multiple entry/exit points, each with a corresponding camera device. Each camera device 102, 104 reads the vehicle identification (ID) (e.g., license plate numbers/letters or other characters) of every vehicle entering or exiting the parking lot 100. The decoded vehicle ID is then transmitted and/or stored in memory as described herein.

A gate 812 can be optionally provided to the entrance, and a corresponding gate 814 to the exit, to bar passage of a vehicle for various reasons, such as when the lot has reached capacity, or any time a vehicle is not permitted in the lot, or to cause a violator to pay a fine prior to exiting.

A kiosk 816 can be provided to the parking lot 100 in a location convenient to persons parking in the lot. The kiosk 816 can be used to submit payments for parking time, to pay fines, to obtain/provide information, etc. In one example embodiment, a kiosk 816 can be provided at the entrance so that the user can provide their payment information upon entrance to the lot 100. The kiosk 816 can be integrated into the same housing as the camera device 102, 104 as well. The kiosk 816 can be communicatively coupled (e.g., networked) to the camera device(s) 102, 104, 108, etc. as part of an integrated parking system as described herein.

In locations where vehicles have only rear license plates, the entrance 804 or exit 806 are correspondingly configured so that the camera devices 102, 104, 108 are placed and aimed so that the rear license plate can be effectively read. Multiple cameras can also be provided (either in a single housing or in separate housings) at a given location to capture and read both the front and rear license plates of each vehicle passing by. A message board 818 can also be provided at the entrance and/or exit of the lot 100 to provide information to users, such as providing information, occupancy status and other messages.

Figure 9:
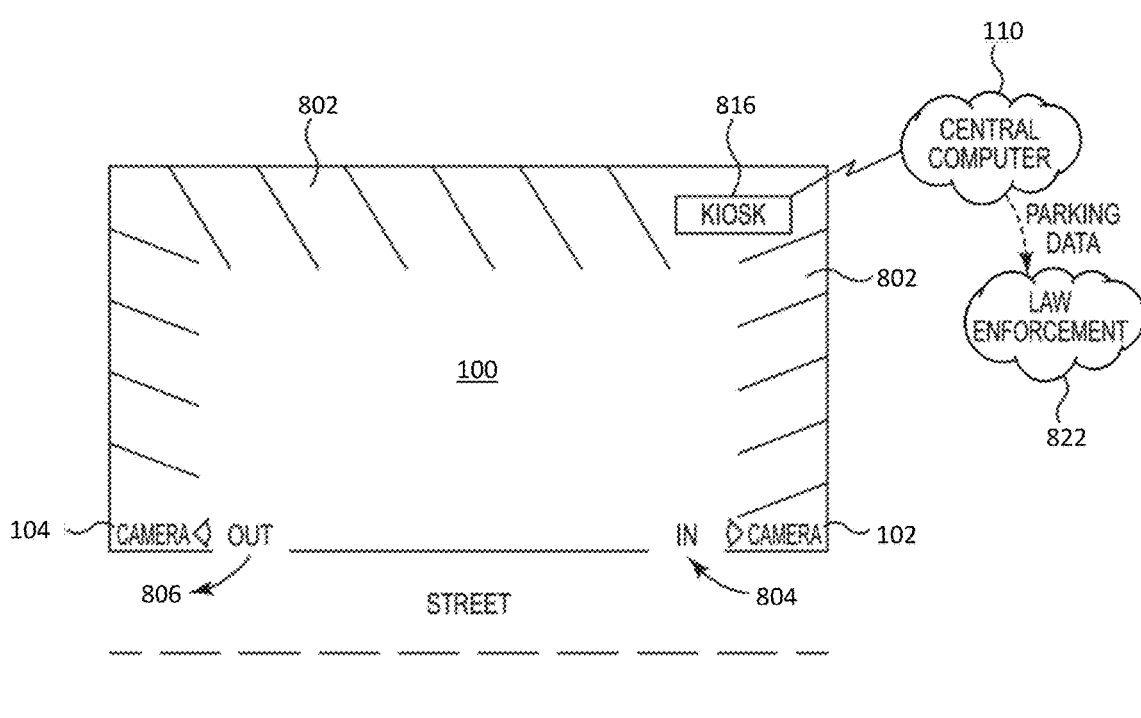
FIG. 9 is a diagram of a parking lot monitoring system according to certain example embodiments.

The electromechanical gates 812, 814 can be eliminated, if desired. Such gates are costly and can fail. Referring to FIG. 9, a gateless parking lot 100 configuration is depicted. In this example, the parking lot 100 is shown with one entrance 804 and one exit 806 for simplicity of explanation, but multiples of each can be provided. Camera devices 102, 104 are placed at the respective entrance 804 and exit 806 of the parking lot 100. A kiosk 816 is also provided to the lot 100. The camera devices 102, 104 are networked with the central computer 110 to report all vehicle data and image data.

The image data from the camera devices 102, 104 can also be automatically relayed to law enforcement systems 822. This allows law enforcement agencies to perform real-time monitoring of who/what is parked where, to compare vehicle ID's (e.g., plates) against a stolen car database, or compare ID data against a person of interest database, or other analysis related to public safety and security. Such processes can be used by law enforcement for monitoring/investigation of Amber alerts, stolen vehicles, scofflaws, felons and crime prevention, among other security related applications. This law-enforcement coupling embodiment could greatly reduce crime and increase the productivity of law enforcement agencies locally, regionally and nationwide. It would be a unique addition to the intelligence gathering done by police today, and an incremental benefit to the communities served.

Figure 10:
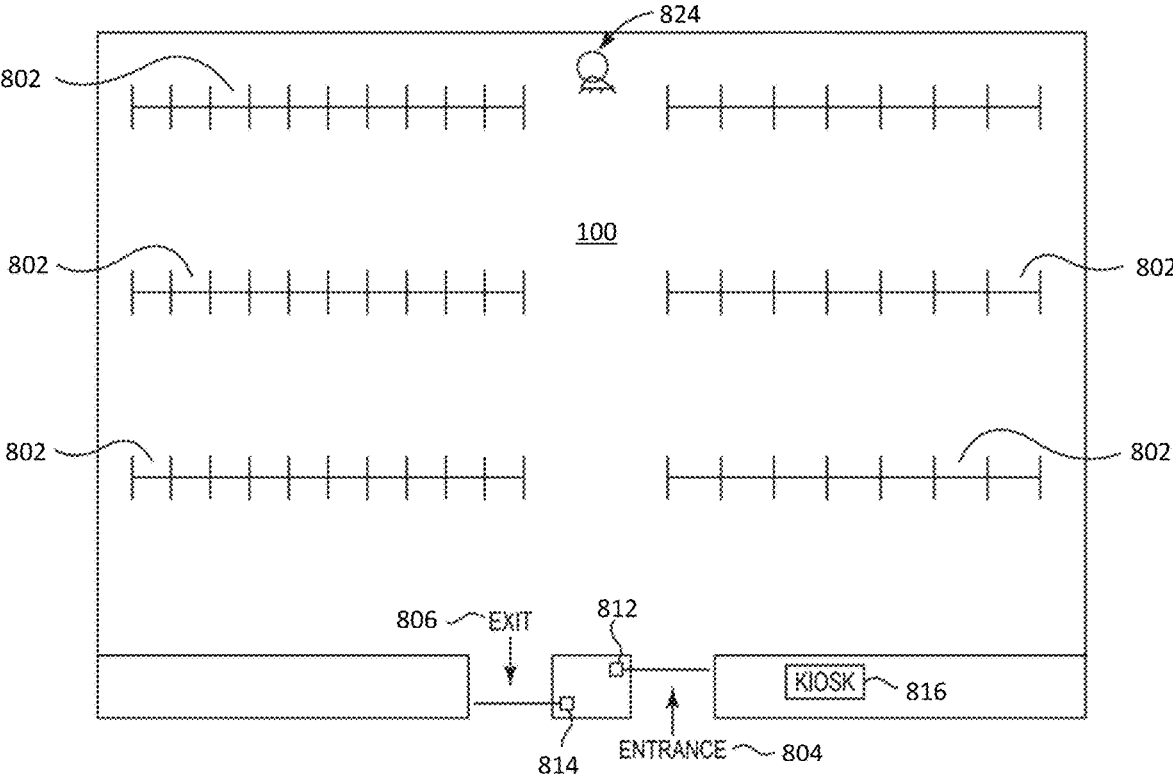
FIG. 10 is a diagram of a parking lot monitoring system according to certain example embodiments.

In FIG. 10, the separate entrance/exit camera devices 102, 104 are replaced with a single camera device 824 mounted at an elevated position above the parking lot 100. The elevated position can be, for example, at the top of a pole in a position that the camera device 824 can see the entrance 804 and exit 806 simultaneously within the camera's fixed field of view. The elevated position allows the camera device 824 to read the license plates of all cars entering and exiting the parking lot 100. The single camera embodiment reduces the equipment costs and places the camera device 824 in a location with lower likelihood of damage due to vandalism. The camera device 824 can also be equipped with motors to selectively adjust rotation angle (azimuth) and elevation angle. The lens of the camera device 824 can also be equipped with zoom capability.

Figure 11:
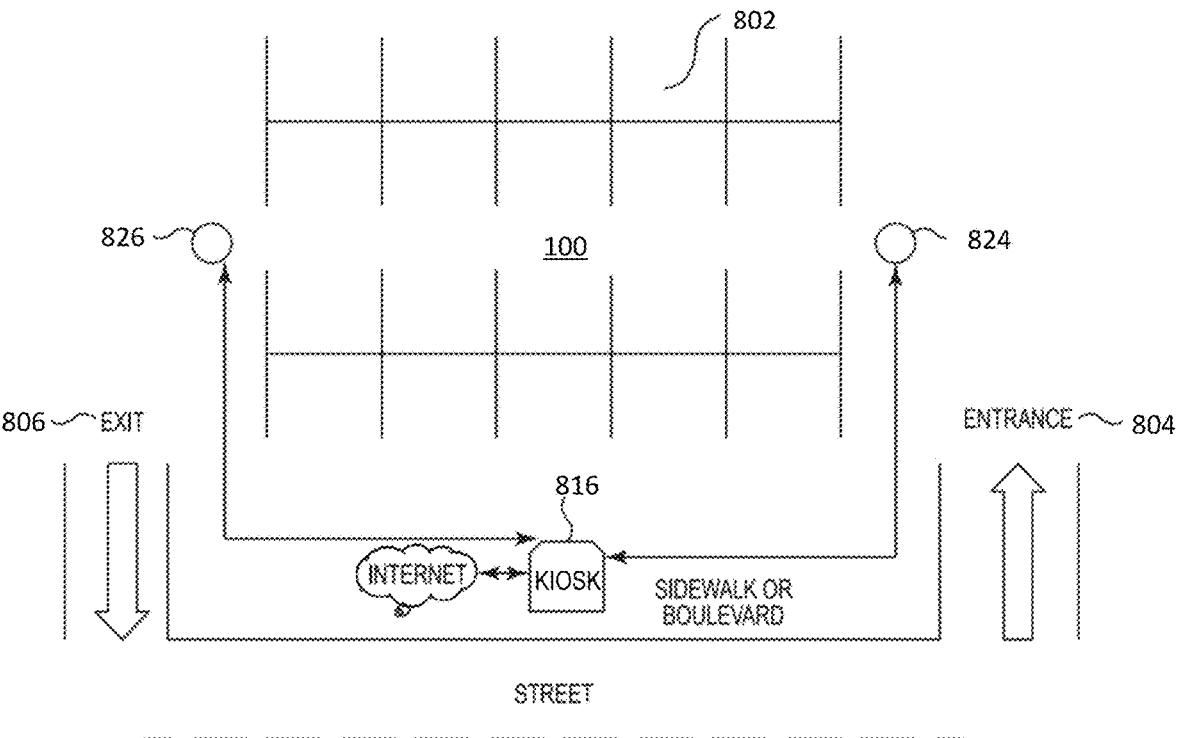
FIG. 11 is a diagram of a parking lot monitoring system according to certain example embodiments.

Additional entrances/exits 804, 806 can be monitored with the same single camera device 824, if they are in that camera's effective field of view. If not in the field of view, then an additional elevated camera device 826 can be utilized as shown in the alternative configuration of FIG. 11. A combination of camera devices 102, 104 at entrance/exit and elevated positions 824, 826 can also be used in further embodiments. Control gates 812 and 814 at the entrance 804 and exit 806 can be provided as an option.

A machine vision detection methodology can be employed by one or more of the cameras 102, 104, 108, 600, 824, 826 to detect the presence of vehicles such as disclosed in U.S. Pat. No. 11,164,452. U.S. Pat. No. 11,164,452 is hereby incorporated herein by reference in its entirety.

Any additional methods and functionality of the systems disclosed in U.S. Pat. No. 10,121,172 B2, U.S. Pat. No. 11,164,452 B2 and U.S. Pat. No. 9,870,648 B2 can be provided to the present system in additional embodiments hereof. Each of U.S. Pat. No. 10,121,172 B2, U.S. Pat. No. 11,164,452 B2 and U.S. Pat. No. 9,870,648 B2 are hereby incorporated herein in their entirety and appended hereto as part of this application.

While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An automated parking system for a parking facility and a valet/check-in area located remote from the parking facility, the parking facility comprising an entrance and an exit, the automated parking system comprising:

a first camera disposed adjacent to the entrance of the parking facility;

a second camera disposed adjacent to the exit of the parking facility;

a third camera disposed in or adjacent to the valet/check-in area; and a central computer located remote from the parking facility and the valet/check-in area, the central computer networked with the first camera, the second camera and the third camera, wherein the first camera is configured to read a vehicle identification of a vehicle entering the parking facility and transmit the vehicle identification of the vehicle entering the parking facility to the central computer, wherein the second camera is configured to read a vehicle identification of a vehicle exiting the parking facility and transmit the vehicle identification of the vehicle exiting the parking facility to the central computer, wherein the third camera is configured to read a vehicle identification of a vehicle passing through the valet/check-in area and transmit the vehicle identification of the vehicle passing through the valet/check-in area to the central computer, wherein the central computer comprises a parking permit database to store vehicle identifications for vehicles with permits for parking in the parking facility, and wherein the central computer is configured to add the vehicle identification of the vehicle passing through the valet/check-in area to the parking permit database.

2. The automated parking system of claim 1, wherein the central computer is configured to compare the vehicle identification of the vehicle entering the parking facility to the stored vehicle identifications in the parking permit database to determine whether there is a match.

3. The automated parking system of claim 2, wherein when the central computer determines that there is no match of the vehicle identification of the vehicle entering the parking facility to the stored vehicle identifications in the parking permit database, the central computer is further configured to calculate a parking fee for a parking duration from a time that the vehicle entered the parking facility to a time that the vehicle exited the parking facility.

4. The automated parking system of claim 2, wherein when the central computer determines that there is a match of the vehicle identification of the vehicle entering the parking facility to the stored vehicle identifications in the parking permit database, the central computer does not calculate an hourly charge for parking by the vehicle.

5. The automated parking system of claim 1, wherein the central computer is configured to prompt an authorized person to manually verify whether to add the vehicle identification of the vehicle passing through the valet/check-in area to the parking permit database before the central computer adds the vehicle passing through the valet/check-in area to the parking permit database.

6. The automated parking system of claim 1, wherein the vehicle identification of the vehicle entering the parking facility and the vehicle identification of the vehicle passing through the valet/check-in area each include characters appearing on a license plate.

7. The automated parking system of claim 1, wherein the vehicle identification of the vehicle entering the parking facility and the vehicle identification of the vehicle passing through the valet/check-in area each include an image of the vehicle.

8. The automated parking system of claim 1, wherein each of the first camera, second camera and third camera are license plate reading (LPR) cameras.

9. The automated parking system of claim 1, wherein the third camera is enclosed within a bollard.

10. The automated parking system of claim 1, wherein the third camera is enclosed within a kiosk.

11. A method of automatically monitoring vehicles entering and exiting a parking facility, the method comprising:

capturing a vehicle identification with a first camera as a vehicle passes through a valet/check-in area that is located remote from the parking facility;

storing the vehicle identification captured by the first camera in a parking permit database of a central computer system that is located remote from the parking facility and the valet/check-in area;

capturing a vehicle identification with a second camera as the vehicle passes through an entrance to the parking facility; and comparing by the central computer system the vehicle identification captured with the second camera to the parking permit database to determine whether there is a match of vehicle identifications maintained in the parking permit database.

12. The method of claim 11, further comprising:

when the central computer determines that there is no match of the vehicle identification captured with the second camera to the parking permit database, calculating by the central computer a parking fee for a parking duration from a time that the vehicle entered the parking facility to a time that the vehicle exited the parking facility; and when the central computer determines that there is a match of the vehicle identification captured with the second camera to the parking permit database, not calculating by the central computer an hourly charge for parking by the vehicle.

13. The method of claim 11, further comprising prompting an authorized person to manually verify whether to add the vehicle identification of the vehicle passing through the valet/check-in area to the parking permit database prior to storing the vehicle identification captured by the first camera in a parking permit database of a central computer system.

14. The method of claim 11, wherein capturing the vehicle identification includes performing a license plate reading of a license plate of the vehicle.

15. The method of claim 14, wherein capturing the vehicle identification further includes transmitting an image of the vehicle to the central computer.

16. The method of claim 15, further comprising, determining by the central computer from the transmitted image at least one of a vehicle type, make, model, year and color, and storing a result of such determination in the parking permit database.

17. The method of claim 11, further comprising purging the stored vehicle identification captured by the first camera from the parking permit database after a predetermined period of time.

18. The method of claim 11, further comprising providing a vehicle sensor coupled to the first camera to detect the approach of the vehicle to the first camera prior to capturing the vehicle identification with the first camera.

\* \* \* \* \*